United States Patent
Prediger et al.

(10) Patent No.: US 11,174,105 B2
(45) Date of Patent: Nov. 16, 2021

(54) TUBE STORAGE AND TRANSPORT DEVICE FOR A TEXTILE MACHINE PRODUCING CROSS-WOUND PACKAGES

(71) Applicant: Saurer Spinning Solutions GmbH & Co. KG, Übach-Palenberg (DE)

(72) Inventors: Eduard Prediger, Mönchengladbach (DE); Erwin Peters, Düren (DE); Lothar Winzen, Herzogenrath (DE); Bodo Hansen, Erkelenz (DE); Lothar Uedinger, Mönchengladbach (DE); Robert Geisler, Wegberg (DE); Heiko Toepke, Baesweiler (DE); Dirk Brakensiek, Neuss (DE); Jonathan Sprecher, Aachen (DE); Philipp Schiffers, Erkelenz-Gerderath (DE); Michael Spitzer, Monschau-Kalterherberg (DE)

(73) Assignee: SAURER SPINNING SOLUTIONS GmbH & CO. KG, Übach-Palenberg (DE)

( * ) Notice: Subject to any disclaimer, the term of this patent is extended or adjusted under 35 U.S.C. 154(b) by 0 days.

(21) Appl. No.: 16/850,232

(22) Filed: Apr. 16, 2020

(65) Prior Publication Data
US 2020/0331701 A1 Oct. 22, 2020

(30) Foreign Application Priority Data
Apr. 18, 2019 (DE) .......................... 102019110294.4

(51) Int. Cl.
*B65G 15/30* (2006.01)
*B65G 47/90* (2006.01)

(52) U.S. Cl.
CPC .............. *B65G 15/30* (2013.01); *B65G 47/90* (2013.01)

(58) Field of Classification Search
None
See application file for complete search history.

(56) References Cited

U.S. PATENT DOCUMENTS

| 3,828,682 A | * | 8/1974 | Klein | D01H 9/182 |
| | | | | 104/91 |
| 4,858,746 A | * | 8/1989 | Ito | B65G 35/08 |
| | | | | 198/465.4 |

(Continued)

FOREIGN PATENT DOCUMENTS

| DE | 44 02 143 A1 | 10/1994 |
| DE | 195 12 891 A1 | 10/1996 |
| DE | 199 05 856 A1 | 8/2000 |

*Primary Examiner* — Kavel Singh
(74) *Attorney, Agent, or Firm* — Nelson Mullins Riley & Scarborough LLP

(57) ABSTRACT

A tube storage and transport device for a textile machine producing cross-wound packages, which has a plurality of similar workstations arranged side-by-side on both longitudinal machine sides, having a central tube magazine and two empty-tube conveyor belts arranged in the region of the longitudinal machine sides is provided. To improve the known tube storage and transport devices, and in particular to optimize the clock times that can be achieved during the empty-tube delivery, the tube magazine has at least two elevator units, that the elevator units have stacked and vertically displaceable holders for empty tubes, that the holders are designed for the empty tubes to be set down in a manner oriented the longitudinal direction of the machine, and that each of the elevator units is connected to one of the empty-tube conveyor belts and is designed in such a way that empty tubes are removed from the elevator units from the longitudinal machine side and transferred onto the empty-tube conveyor belts.

10 Claims, 3 Drawing Sheets

(56) References Cited

U.S. PATENT DOCUMENTS

| | | | | |
|---|---|---|---|---|
| 5,088,591 A | * | 2/1992 | Grecksch | B65H 67/06 |
| | | | | 198/465.1 |
| 5,168,696 A | * | 12/1992 | Stahlecker | B65H 67/064 |
| | | | | 198/418.6 |
| 5,184,305 A | * | 2/1993 | Gronenberg | B65H 63/00 |
| | | | | 242/474 |
| 5,195,687 A | * | 3/1993 | Derichs | D01H 9/18 |
| | | | | 242/474.1 |
| 5,347,449 A | * | 9/1994 | Meyer | D01H 13/14 |
| | | | | 57/264 |
| 6,056,228 A | * | 5/2000 | Resch | B65H 49/38 |
| | | | | 242/473.6 |
| 2003/0056487 A1 | * | 3/2003 | Zipperer | B65H 54/26 |
| | | | | 57/264 |
| 2014/0315527 A1 | * | 10/2014 | Ramer | G06F 16/68 |
| | | | | 455/414.2 |
| 2017/0315527 A1 | * | 11/2017 | Weidner-Bohnenberger | |
| | | | | B65H 54/26 |

\* cited by examiner

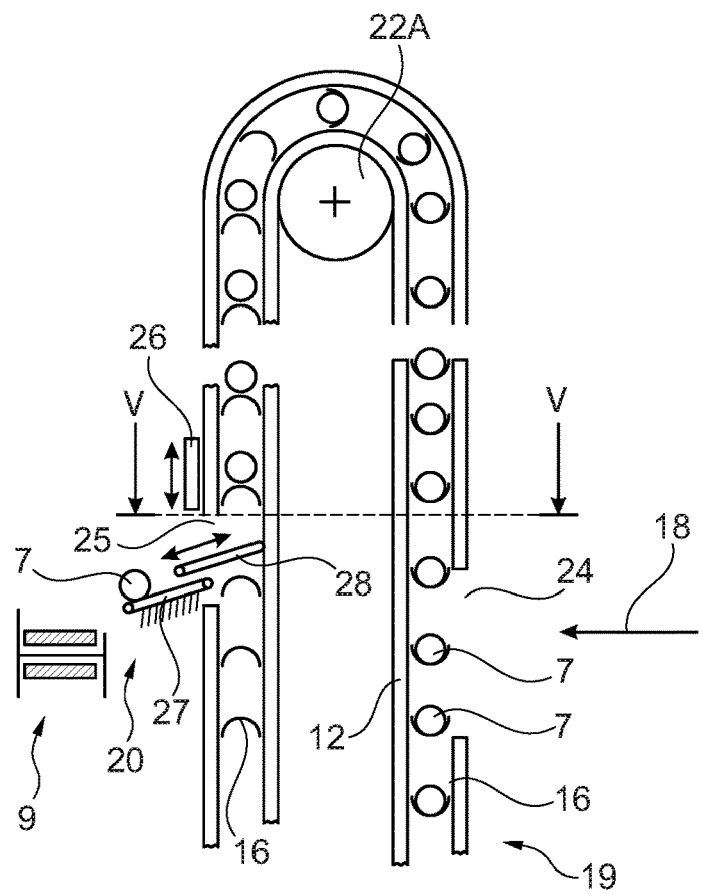
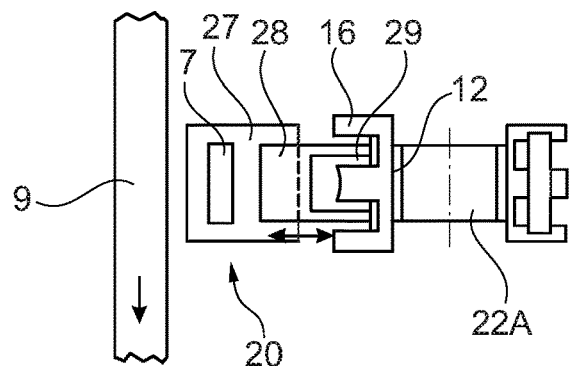
Fig. 4
Fig. 5

TUBE STORAGE AND TRANSPORT DEVICE FOR A TEXTILE MACHINE PRODUCING CROSS-WOUND PACKAGES

CROSS-REFERENCE TO RELATED APPLICATIONS

This application claims priority from German National Patent Application No. 10 2019 110 294.4, filed Apr. 18, 2019, entitled "Hülsenspeicher-und-transporteinrichtung für eine Kreuzspulen herstellende Textilmaschine", the entire contents of which are incorporated herein by reference.

FIELD OF THE INVENTION

The invention concerns a tube storage and transport device for a textile machine producing cross-wound packages, which has a plurality of similar workstations arranged side-by-side on both longitudinal machine sides, comprising a central tube magazine and two tube transport belts arranged in the region of the longitudinal machine sides.

BACKGROUND OF THE INVENTION

Tube storage and transport devices for textile machines producing cross-wound packages have been known for a long time and have been described in numerous patent applications, in some cases in considerable detail.

For example, German Patent Publication DE 44 02 143 A1 discloses a textile machine producing cross-wound packages, in the embodiment example an open-end rotor spinning machine, which has two rows of workstations running in the longitudinal machine direction and a transport device arranged between the rows of workstations for clearing completed cross-wound packages and for providing fresh empty tubes. The transport device consists of a plurality of linked, circulating individual transport elements, each of which has a transport surface for forwarding a cross-wound package completed on the workstations or an empty tube required on the workstations.

The workstations are supplied by an automated service unit which, among other things, has various devices for replacing the cross-wound packages and exchanging the empty tubes. The service unit has, among other things, a special tube gripper, which can take the empty tubes from the transport surfaces of the transport unit and load them into the package cradles of the relevant workstations.

However, from this known patent application no details can be taken regarding the design or the function of an associated tube store. The transport device described in German Patent Publication DE 44 02 143 A1 is also quite complex overall in its constructive design and therefore cost intensive.

The device in accordance with German Patent Publication DE 44 02 143 A1 was not able to become established in practice. German Patent Publication DE 195 12 891 A1 discloses a supply and clearance device for textile machine producing cross-wound packages, in which the delivery device for the empty tubes and the clearance device for the finished cross-wound packages are arranged separately.

The associated textile machine is designed as a single-row textile machine, in the embodiment example as an automatic winding machine, and has an empty-tube conveyor belt running along the length of the machine in front of or slightly above its workstations, and a cross-wound package clearance belt positioned behind the workstations. The empty-tube conveyor belt is also connected to a central tube magazine at the machine end. The automatic winding machine is operated by a service unit which has a device that allows it to first transfer an empty tube, requested at the tube magazine and supplied via the empty-tube conveyor belt, into a workstation's own interim storage and then to load the empty tube into the package cradles of the relevant workstations by means of a gripping device.

The design described above allows the textile machine workstations to be supplied with empty tubes relatively quickly and reliably; however, the known device is only suitable for textile machines whose workstations are arranged in a single row, as is the case, for example, with automatic winding machines.

The known transport device is less suitable for two-row textile machines, for example open-end rotor spinning machines, because the empty tubes must always be inserted in a tip-oriented manner into the workstations arranged on both longitudinal sides of such textile machines. This means that for two-row textile machines a portion of the empty tubes held ready in the central tube magazine must first be turned 180° before they can be inserted in the package cradles of the workstations of one machine side.

A tube storage and transport device, which if necessary requires a tip-oriented delivery of empty tubes to the workstations on both machine sides of an open-end rotor spinning machine, is described in German Patent Publication DE 199 05 856 A1. This patent application discloses open-end rotor spinning machines which have, between their end frames, a plurality of workstations which are supplied by multiple service units during operation. In this known open-end rotor spinning machine, the workstations arranged on both longitudinal machine sides, which, as is common, each have a spinning apparatus as well as a downstream winding apparatus are supplied and cleared, respectively, by two separate transport devices. This means that, between the workstations, a cross-wound package transport device comprising two conveyor belts is arranged and an empty-tube transport device is installed, for example above each workstation. This means that every workstation side of the open-end rotor spinning machine is equipped with its own cross-wound package conveyor belt and its own empty-tube conveyor belt.

When a cross-wound package is completed on one of the workstations of an open-end rotor spinning machine of this kind and must be replaced with a new empty tube, the workstation first requests a service unit, which positions itself at the relevant workstation. Then the workstation or the service unit orders a fresh empty tube, which is delivered to the workstation by means of the associated empty-tube conveyor belt.

In response to such a request, the empty tubes are transferred in a tip-oriented manner to the empty-tube conveyor belt of the right-hand or left-hand machine side and to the corresponding workstation, or are conveyed into the region of the service unit positioned at the workstation. This means that the empty tubes are stocked in a central tube magazine, which is arranged at the machine end and has several transport chains, which are arranged side-by-side, equipped with arbours, linked by a shaft and driven by a common electric motor.

The empty tubes held ready on the arbours of the tube magazine are transferred by a "tube slider" onto a continuously revolving troughed belt, which can be controlled in a clocked manner and forwards the empty tubes successively either to a tube turner or to a downstream tube transfer position. Both the tube turner and the troughed belt are then parked in a stand-by position. This means that, in response to a corresponding request, the tube turner transfers its empty tube to, for example, the tube conveyor belt of the left-hand machine side, while, if required, the troughed belt transfers its empty tube to the tube conveyor belt of the right-hand machine side.

The known tube storage and transport device does allow tip-oriented empty tubes to be reliably supplied to the workstations arranged on both longitudinal machine sides of an open-end rotor spinning machine. However, due to the device's very complex constructive design and its numerous moving components, e.g. the tube slider, the troughed belt and/or the tube turner, it needs relatively frequent repairs. The clock times that can be achieved with a tube storage and transport device of this kind also seem to have room for improvement.

SUMMARY OF THE INVENTION

Proceeding from the prior art mentioned above, the problem addressed by the invention is improving the known tube storage and transport devices, and in particular optimising the clock times that can be achieved with the empty tube supply.

According to the invention, this problem is solved by the fact that the tube magazine has at least two elevator units, that the elevator units have stacked and vertically displaceable holders for empty tubes, that the holders are designed for the empty tubes to be set down in a manner oriented in the longitudinal direction of the machine, and that each of the elevator units is connected to one of the empty-tube conveyor belts and is designed in such a way that empty tubes can be removed from the elevator units from the longitudinal machine side and transferred onto the empty-tube conveyor belts.

Advantageous configurations of the invention are set forth herein.

The design of a tube storage and transport device according to the invention has in particular the advantage that such a design makes it possible to stock all the empty tubes required at the workstations in a tip-oriented manner in a simple way, with no use of a tube turner or a tube trolley having a rotating gripper, meaning that the constructive expense of the tube storage and transport device can be reduced considerably. A rapid, needs-based transfer of empty tubes from the elevator units onto the empty-tube conveyor belts can be initiated at any time.

By arranging at least one elevator unit on each of the two machine sides of a textile machine producing cross-wound packages and directly connecting them to an associated empty-tube conveyor belt, it is also possible to immediately transfer one of the empty tubes stocked in the elevator unit to the associated empty-tube conveyor belt and to deliver the empty tube quickly to the workstation that requested the empty tube.

The elevator units can be arranged at the machine end. However, it is also possible to arrange the elevator units between the machine ends, preferably in the centre of the machine. If there are multiple pairs of elevator units, these can also be distributed over the length of the machine.

The use of a tube storage and transport device according to the invention results not only in an optimization of the clock times that can be achieved in the empty-tube transfer of the tube store, but also to a significant reduction of possible sources of error since complicated moving components are largely forgone.

The holders for empty tubes are preferably designed in such a way that empty tubes lie with their outside surface on the holders. In this way the empty tubes can be removed from the longitudinal machine side easily. The holders can have a level surface for setting down the empty tubes. However, the holders are preferably designed as receiving troughs.

Because the empty tubes can be removed from the elevator units from the longitudinal machine side, multiple holders can be arranged side-by-side in the longitudinal direction of the machine without this causing problems during the removal of empty tubes. Thus an adequate number of empty tubes can be stored to ensure the interruption-free operation of the textile machine.

In another advantageous embodiment, each of the elevator units consists of a plurality of individual elevators, which are arranged side-by-side in the longitudinal direction of the machine and are selectively controllable. The individual elevators are designed and arranged in such a way that a rapid, direct transfer of the empty tubes stored in the individual elevators to the associated empty-tube conveyor belt is ensured.

The embodiment described above allows the individual elevators of an elevator unit to be equipped with different empty tubes so that empty tubes for a certain yarn batch can be held ready in each of the individual elevators. This means that an open-end rotor spinning machine having a tube storage and transport device, the central tube magazine of which is equipped with elevator units that each have a plurality of individual elevators, can selectively process different yarn batches on the workstations of both of its machine sides at any time. By arranging the elevators immediately next to the tube conveyor belts it is ensured that the workstations can reliably be supplied with empty tubes quickly at all times.

Preferably each elevator unit, especially preferably each of the individual elevators, as is known in connection with elevators, has a continuous traction mechanism that is equipped with holders, preferably with receiving troughs, for the empty tubes and is guided over at least two deflection rollers. In the process the holders are arranged and designed so that they can be easily loaded from one of the longitudinal machine sides with empty tubes that are tip-oriented with respect to the associated workstation. A tried and tested embodiment of this kind allows not only for reliable stocking of a great number of empty tubes, but if necessary also a problem-free, reliable transfer of the empty tubes, stored in a tip-oriented manner, to a downstream empty-tube conveyor belt.

Advantageously, a drive is also connected to at least one of the deflection rollers and is controllable in a defined manner by means of a control unit and, for example, is designed as a stepper motor. The control unit can be the machine controller, a workstation controller, the control unit of a movable operating unit, or also a separate control unit of the tube storage and transport device. In this way an exact, clocked operation of the elevator unit or of the individual elevator is possible, and therefore so too is a secure transfer of empty tubes to a downstream empty-tube conveyor belt.

In another advantageous embodiment, an empty-tube transfer device is present that corresponds with the holders of the elevator units for transferring the empty tube onto an empty-tube conveyor belt. The empty-tube transfer device preferably has a displaceably mounted fork element that can be positioned in the region of the travel path of the holders, which for their part have recesses whose shape is coordinated with the fork element of the empty-tube transfer device. This means that the empty-tube transfer devices are designed in such a way that, if necessary, they can be positioned in the travel path of the holders and therefore also in the travel path of the empty tubes and then transfer the empty tubes located in the holders from the holders onto an empty-tube conveyor belt.

As already indicated above, the holders are designed and arranged so that the empty tubes can be stocked in the holders in a tip-oriented manner with respect to the associated workstation and the individual elevators can be loaded with fresh empty tubes from one of the longitudinal machine sides of the textile machine producing cross-wound packages. This means that the holders of the elevator units can also be easily reloaded during the ongoing spinning process at any time from the side, for example by the operating staff or an empty-tube loading device.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

Further details of the invention can be taken from the embodiment example explained below on the basis of the drawings.

FIG. 4 shows an empty-tube transfer device arranged on an individual elevator for transferring fresh empty tubes out of the receiving troughs of the individual elevator onto a tube conveyor belt, FIG. 5 shows the empty-tube transfer device in accordance with section V-V of FIG. 4.

DESCRIPTION OF THE PREFERRED EMBODIMENTS

Figure 1:
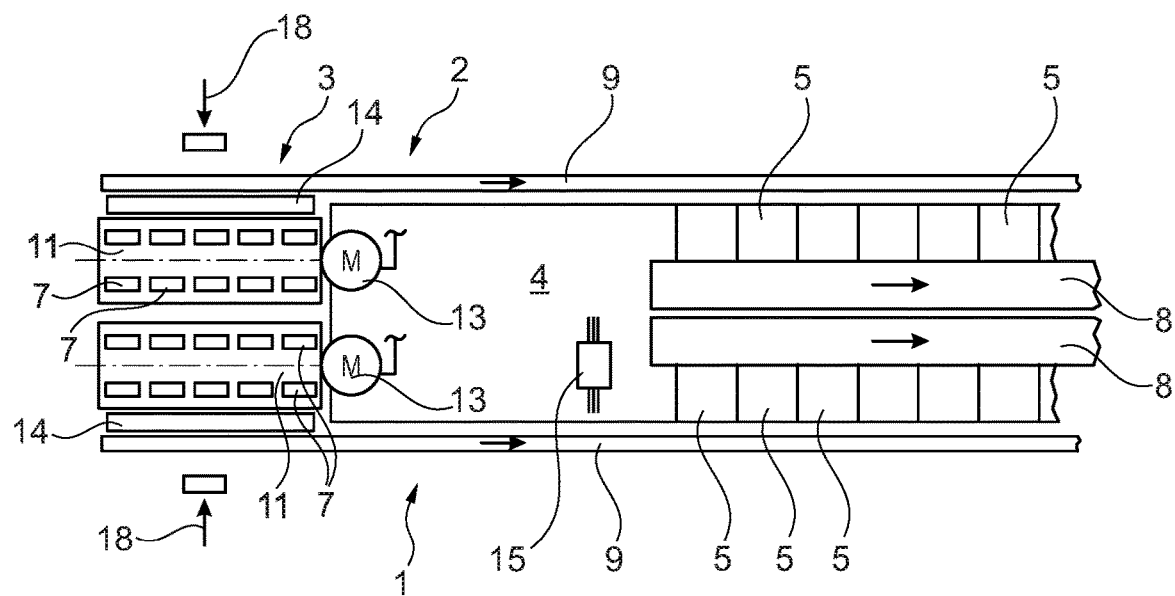
FIG. 1 is a schematic top view of a first embodiment of a central tube store of a tube storage and transport device according to the invention, said tube store being arranged at the machine end of an open-end rotor spinning machine.

FIG. 1 shows a first embodiment of a tube magazine 3, arranged in the machine-end region of a textile machine producing cross-wound packages, of a tube storage and transport device labelled collectively with the reference sign 2. The textile machine producing cross-wound packages is designed as an open-end rotor spinning machine 1 and has, as is known, a plurality of workstations 5 between its end frames 4, said workstations being arranged on both longitudinal machine sides of the open-end rotor spinning machine 1, as indicated in FIG. 1. The workstations 5, which, as is also known and therefore not shown in more detail, each have a spinning apparatus and a downstream winding apparatus, are supplied during the spinning/winding operation by multiple service units (not shown), which, for example, are mounted movably on a rail structure. The service units (generally "doffing and clearing trolleys") take action when an operating event occurs on one of the workstations. Such an operating event exists, for example, if a cross-wound package 6 has been completed on one of the workstations 5 and must be exchanged for a fresh empty tube 7.

The open-end rotor spinning machine 1 also has "a cross-wound package transport device 8", i.e. the textile machine has conveyor belts running the length of the machine between its workstations 5 for removing finished cross-wound packages 6.

Furthermore, the open-end rotor spinning machine 1 is equipped with a tube storage and transport device 2 designed according to the invention which, as can be seen, substantially consists of a central tube magazine 3, which is arranged at the machine end and is formed by at least two elevator units 11, and tube conveyor belts 9 running the length of the machine and connected to the elevator units 11 for transferring fresh empty tubes 7 from the tube magazine 3 to the workstations 5.

Additionally, a tube distribution device 14 is installed in the region of each of the elevator units 11, which is formed, for example, by a tube trolley, which picks up the empty tube 7 held ready in the relevant elevator unit 11 by a tube gripper and transfers it onto the tube conveyor belt 9. The elevator units 11, which are each assigned to one machine side of the open-end rotor spinning machine 1, each have, as described in more detail below, a continuous traction mechanism 12 which is equipped with receiving troughs 16 and is drivable in a defined manner by means of an electric drive 13. In the receiving troughs 16, empty tubes 7 are stocked in a tip-oriented manner with respect to the associated workstation 5. The electric drives 13 are connected to a machine controller 15 of the open-end rotor spinning machine 1 and are controllable in a targeted manner thereby.

As indicated schematically in FIG. 1 by arrows 18, the elevator units 11 can be loaded from the longitudinal machine sides of the textile machine. This means that, if necessary, fresh empty tubes 7 can be inserted, for example by the operating staff, from the longitudinal machine sides into the receiving troughs 16 of the elevator units 11. In the process the empty tubes 7 are inserted in a tip-oriented manner into receiving troughs 16 of the elevator units 11, so as to fit in the workstations 5 of the relevant machine side.

Figure 2:
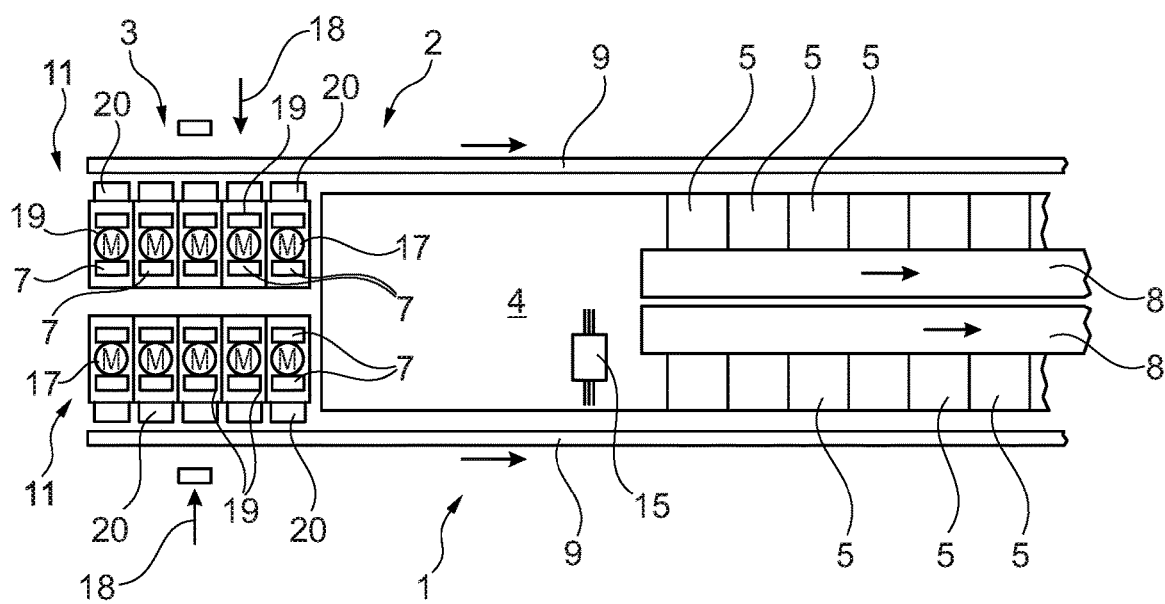
FIG. 2 is a schematic top view of another embodiment of the tube store of a tube storage and transport device according to the invention.

The embodiment example in accordance with FIG. 2 differs from the embodiment example in accordance with FIG. 1 substantially in that each of the elevator units 11 consists of a plurality of individual elevators 19. This means that each of the elevator units 11 has a number of individual elevators 19 that are equipped with individual drives 17, which, for example, are designed as stepper motors. The individual drives 17 are connected to the machine controller 15 of the open-end rotor spinning machine 1.

As can be seen in FIG. 4 in particular, in the region of the individual elevators 19 empty-tube transfer devices 20 are also installed, which are designed in such a way and positionable in such a loading position that an empty tube 7 stocked in a receiving trough 16 of an individual elevator 19 can be transferred onto one of the empty-tube conveyor belts 9 as needed.

Figure 3:
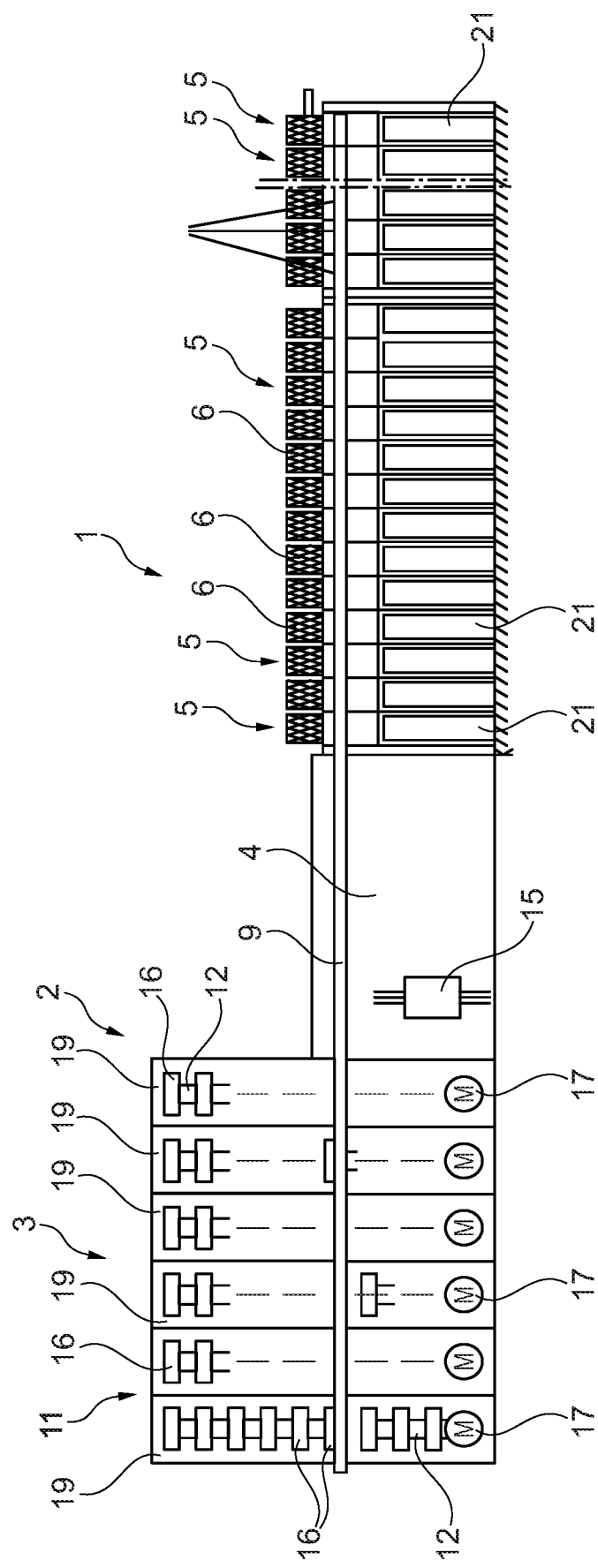
FIG. 3 is a front view of an open-end rotor spinning machine having a tube storage and transport device of the invention, according to FIG. 2.

FIG. 3 is a front view of the embodiment example, described on the basis of FIG. 2, of an open-end rotor spinning machine 1 equipped with a tube storage and transport device 2 according to the invention. As can be seen and has already been explained above, such open-end rotor spinning machines 1 are equipped, between end frames 4, with a plurality of workstations 5 on which, as is known, a cross-wound package 6 is created, in each case by means of an open-end spinning device and a winding device, from a fibre band that is stocked in a spinning can 21; after said cross-wound package is finished, it is transported away by means of a cross-wound package transport device 8 (not visible in FIG. 3).

In the region of the end frame 4 of the open-end rotor spinning machine 1, a central tube magazine 3 of a tube storage and transport device 2 according to the invention is arranged. As described above in connection with FIG. 2, the central tube magazine 3 preferably consists of two elevator units 11, one elevator unit 11 being installed on each of the two longitudinal machine sides.

For their part, the elevator units 11 have a number of individual elevators 19. As indicated in FIG. 3, each of these individual elevators 19 has an individual drive 17, for example a stepper motor, which is connected to the machine controller 15 of the open-end rotor spinning machine 1. Each individual elevator 19 also has a continuous traction mechanism 12 that is equipped with receiving troughs 16 and is drivable in a clocked manner. This means that each of the empty tubes 7 stocked in a receiving trough 16 of an individual elevator 19 can be conveyed by the individual drives 17 into the region of an empty-tube transfer device 20 (which is not shown in FIG. 3 but is described in relative detail on the basis of FIGS. 4 and 5) and transferred from this device onto one of the downstream empty-tube conveyor belts 9.

FIGS. 4 and 5 show a possible embodiment of an empty-tube transfer device 20 arranged in the region of an individual elevator 19. As can be seen, in accordance with the embodiment example the individual elevator 19 has two deflection rollers 22A and 22B, the deflection roller 22B being equipped with an individual drive 17 designed as a hub drive and stepper motor. A continuous traction mechanism 12 is guided over the deflection rollers 22A and 22B and is equipped with a plurality of receiving troughs 16 in which empty tubes 7 are stocked, in each case in a tip-oriented manner.

The individual elevator 19 is also provided with a housing 23, which has an opening 24 and a closable housing opening 25. Via the opening 24, as indicated symbolically by the arrow 18, fresh empty tubes 7 can be introduced into the housing 23 of the individual elevator 19 and positioned in the receiving troughs 16 in a tip-oriented manner. In the region of the opening 25, which can be closed during the reloading of the individual elevator 19, for example by a slider 26, an empty-tube transfer device 20 is arranged, which preferably has a stationary tube guide 27 and a displaceably mounted fork element 28.

The fork element 28 can be extended in the direction of the individual elevator 19 and positioned, when in the operating state, in the region of the travel path of the tipped, backwards-moving receiving troughs 16 in such a way that empty tubes 7 that are carried along are diverted in the direction of an empty-tube conveyor belt 9. As shown in particular in FIG. 5, in the process the receiving troughs 16 have recesses 29 which are designed and arranged in such a way that they correspond with the fork element 28 of the empty-tube transfer device 20. This means that the recesses 29 in the receiving troughs 16 are designed in such a way that the fork element 28 does not impede the course of the receiving troughs 16.

Function of the device (explained using the embodiment example FIG. 2):

Before the start of each batch or at the beginning of the start of each batch the tube storage and transport device 2 according to the invention is first "loaded". This means that the individual elevators 19 of the elevator units 11 of a central tube magazine 3 of the open-end rotor spinning machine 1 are filled with fresh empty tubes 7 of the relevant batches.

The receiving troughs 16 of the individual elevators 19 are loaded with fresh empty tubes 7 of the new yarn batches, as indicated in FIGS. 2 and 4 by arrows 18, from the longitudinal machine sides of the open-end rotor spinning machine 1. This means that, via corresponding openings 24 in the housings 23 of the individual elevators 19, fresh empty tubes 7 are introduced into the housing 23 of the individual elevators 19 and positioned in a tip-oriented manner in the receiving troughs 16 arranged on continuous traction mechanisms 12. During the loading of the individual elevators 19 with a plurality of fresh empty tubes 7, the housing openings 25 are closed, for example by sliders 26. This ensures that the empty tubes 7 cannot fall out of the individual elevators 19 in the region of the housing openings 25 during the loading.

During the spinning process the empty tubes 7 that are stocked in a tip-oriented manner in the receiving troughs 16 of the individual elevators 19 can be transferred relatively easily to the workstations 5 of the open-end rotor spinning machine 1 as needed and in a timely manner, i.e. when, in the course of the regular spinning operation on one of the workstations, a "cross-wound package/empty tube doffing cycle" is pending when one of the cross-wound packages 6 has reached its prescribed diameter and must be replaced as quickly as possible with a fresh empty tube 7.

Such a cross-wound package/empty-tube change cycle is generally performed automatically by a service unit, for example a "doffing and clearing trolley". The doffing and cleaning trolley moves, e.g. when notified by the central machine controller 15 of the textile machine, to the relevant workstation 5 and locks itself in place there. The service unit then transfers the finished cross-wound package 6 onto a cross-wound package transport device 8 arranged behind the workstation 5. Simultaneously, the service unit or the relevant workstation 5 at the central tube magazine 3 requests a fresh empty tube 7 of the relevant yarn batch.

Upon the request for a fresh empty tube 7, the individual elevator 19 of the tube magazine 3, which is equipped with empty tubes 7 of the relevant yarn batch, is activated. This means that at the relevant individual elevator 19 an empty-tube transfer device 20 installed in the region of a housing opening 25 is activated and the individual elevator 19 is clocked further by one receiving-trough interval. The empty-tube transfer device 20, which is known to consist of a stationary tube guide 27 and a displaceably mounted fork element 28, positions the fork element 28 in such a way in the running region of the receiving troughs 16 that an empty tube 7 advanced by means of a receiving trough 16 is deflected onto an empty-tube conveyor belt 9. The empty-tube conveyor belt 9 then conveys the requested empty tube 7 as quickly as possible in a tip-oriented manner to the relevant workstation 5, where the empty tube 7 is picked up by the service unit and inserted into the package cradles of the workstation 5.

The cross-wound package/empty tube changing cycle is thereby concluded, and a new spinning process can be started on the workstation 5.

LIST OF REFERENCE SIGNS

1 Open-end rotor spinning machine
2 Tube storage and transport device
3 Tube magazine
4 End frame 5 Workstation
6 Cross-wound package
7 Empty tube
8 Cross-wound package transport device
9 Empty-tube conveyor belt
11 Elevator unit
12 Continuous traction mechanism
13 Electric drive
14 Tube distribution device
15 Machine controller
16 Receiving trough
17 Individual drive
18 Arrow
19 Individual elevator
20 Empty-tube transfer device
21 Spinning can
22 Deflection roller
23 Housing
24 Opening
25 Housing opening
26 Slider
27 Tube guide
28 Fork element
29 Recess It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A tube storage and transport device for a textile machine producing cross-wound packages, which has a plurality of similar workstations arranged side-by-side on both longitudinal machine sides, comprising a central tube magazine and two empty-tube conveyor belts arranged in the region of the longitudinal machine sides, with an empty-tube conveyor belt positioned on both longitudinal machine sides,
characterized in that
the central tube magazine has at least two elevator units,
the at least two elevator units have stacked and vertically displaceable holders for empty tubes,
the holders are designed for the empty tubes to be set down in a manner oriented in the longitudinal direction of the textile machine,
the at least two elevator units are each connected to one of the empty-tube conveyor belts and are designed in such a way that empty tubes are removed from the elevator units from the longitudinal machine side and transferred onto one of the empty-tube conveyor belts.

2. The tube storage and transport device according to claim 1, characterized in that the holders for the empty tubes are designed in such a way that the empty tubes lie with their outside surface on the holders.

3. The tube storage and transport device according to claim 1, characterized in that multiple holders are arranged side-by-side in the longitudinal direction of the textile machine.

4. The tube storage and transport device according to claim 1, characterized in that each of the elevator units has a plurality of individual elevators, which are arranged side-by-side in the longitudinal direction of the textile machine and are selectively controllable.

5. The tube storage and transport device according to claim 1, characterized in that each elevator unit has at least one continuous traction mechanism that is guided over deflection rollers and equipped with the holders for the empty tubes.

6. The tube storage and transport device according to claim 5, characterized in that an individual drive is connected to at least one deflection roller and is controlled by a control unit.

7. The tube storage and transport device according to claim 1, characterized in that one empty-tube transfer device is present that corresponds with the holders of the elevator units for transferring the empty tubes onto an empty-tube conveyor belt.

8. The tube storage and transport device according to claim 7, characterized in that the empty-tube transfer device has a displaceably mounted fork element, which is positioned in a region of a travel path of the holders.

9. The tube storage and transport device according to claim 8, characterized in that the holders have recesses whose shape is coordinated with the fork element of the empty-tube transfer device.

10. The tube storage and transport device according to claim 1, characterized in that the holders are designed in such a way that the empty tubes are stocked on the holders in a tip-oriented manner with respect to an associated workstation.

* * * * *